United States Patent
Zhang et al.

(10) Patent No.: US 9,465,272 B2
(45) Date of Patent: Oct. 11, 2016

(54) ELECTRICALLY CONTROLLED FLUORESCENT LIQUID CRYSTAL LIGHT VALVE AND DISPLAY DEVICE THEREOF

(71) Applicants: BOE TECHNOLOGY GROUP CO., LTD., Beijing (CN); HEIFEI XINSHENG OPTOELECTRONICS TECHNOLOGY CO., LTD., Hefei, Anhui (CN)

(72) Inventors: Guiyu Zhang, Beijing (CN); Ming Hu, Beijing (CN); Taofeng Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/572,736

(22) Filed: Dec. 16, 2014

(65) Prior Publication Data

US 2016/0154270 A1 Jun. 2, 2016

(30) Foreign Application Priority Data

Dec. 1, 2014 (CN) .......................... 2014 1 0710835

(51) Int. Cl.
*G02F 1/1333* (2006.01)
*G02F 1/137* (2006.01)
*C09K 11/06* (2006.01)

(52) U.S. Cl.
CPC ........... *G02F 1/13762* (2013.01); *C09K 11/06* (2013.01); *G02F 1/137* (2013.01); *C09K 2211/1011* (2013.01); *G02F 2001/13756* (2013.01)

(58) Field of Classification Search
CPC .............. G02F 1/13762; G02F 1/137; G02F 2001/13756; C09K 11/06; C09K 2211/1011
See application file for complete search history.

(56) References Cited

U.S. PATENT DOCUMENTS

| 6,224,787 B1* | 5/2001 | Hanna | C09K 19/02 |
| | | | 252/299.01 |
| 6,528,940 B1* | 3/2003 | Okada | H01L 51/5012 |
| | | | 313/504 |
| 2001/0004107 A1* | 6/2001 | Hanna | C09K 11/06 |
| | | | 252/299.3 |
| 2003/0168970 A1* | 9/2003 | Tominaga | C07C 15/28 |
| | | | 313/504 |
| 2015/0146156 A1* | 5/2015 | Hirai | C09K 19/56 |
| | | | 349/183 |

* cited by examiner

FOREIGN PATENT DOCUMENTS

IT WO 2006003688 A1 * 1/2006 ............. C09K 11/06

*Primary Examiner* — Donald Raleigh
(74) *Attorney, Agent, or Firm* — Blakely Sokoloff Taylor & Zafman LLP

(57) ABSTRACT

The present disclosure relates to an electrically controlled fluorescent liquid crystal light valve and a display device thereof. The electrically controlled fluorescent liquid crystal light valve comprises a liquid crystal cell, a disubstituted phenylethylene photoluminescent material miscible with the liquid crystal molecules in the liquid crystal cell, and a control circuit for controlling the liquid crystal cell. By virtue of the electrically controlled fluorescent liquid crystal light valve and display device thereof according to the present disclosure, the disubstituted phenylethylene photoluminescent material used therein, as compared to a conventional liquid crystal light valve that uses a cyan-substituted-diphenylethylene photoluminescent material, has a better molecule planarity and a greater electron delocalization, which excites fluorescence more easily, exhibits more luminous efficiency and can effect a higher contrast; moreover, the disubstituted phenylethylene photoluminescent material used in the electrically controlled fluorescent liquid crystal light valve of the present disclosure has a fine compatibility with liquid crystal molecules, for which only a blending with the liquid crystal molecules is required before they can become homogenous, where the manufacturing process is simple.

20 Claims, 2 Drawing Sheets

INCIDENT LIGHT

INCIDENT LIGHT

ELECTRICALLY CONTROLLED FLUORESCENT LIQUID CRYSTAL LIGHT VALVE AND DISPLAY DEVICE THEREOF

RELATED APPLICATIONS

The present application claims the benefit of Chinese Patent Application No. 201410710835.6, filed Dec. 1, 2014, the entire disclosure of which is incorporated herein by reference.

TECHNICAL FIELD

The present disclosure relates to a liquid crystal light valve, and in particular, to an electrically controlled fluorescent liquid crystal light valve and a display device thereof.

BACKGROUND

Liquid crystal materials for use in the display field are mainly TN-LCD liquid crystals, STN-LCD liquid crystals and TFT-LCD liquid crystals. These small-molecule liquid crystal compounds can only serve as the body material for liquid crystal display, while current liquid crystal display devices still require the use of light-emitting diodes as a source of backlight and cannot reach self-illumination. Therefore, the design of an self-luminous material to be used as the backlight source would largely reduce the cost and simplify the process. However, among the aforesaid liquid crystal materials, there are few materials compatible with a luminous property.

Although it has been proposed in the prior art to manufacture a liquid crystal with dispersed fluorescent molecules by doping a cyan-substituted-diphenylethylene liquid crystal material with nematic-phase liquid crystal, such cyan-substituted-diphenylethylene liquid crystal material has the drawbacks of a poorer molecule planarity, a lesser electron delocalization, exciting fluorescence less easily, exhibiting less luminous efficiency and a lower contrast, and being less compatible with the liquid crystal molecules, and so forth.

Hence, there is an urgent need in the prior art for solving or at least alleviating at least a part of the drawbacks existent in the prior art.

SUMMARY

In view of this, the present disclosure provides an electrically controlled fluorescent liquid crystal light valve and a display device comprising the electrically controlled fluorescent liquid crystal light valve, which can solve or at least alleviate at least a part of the drawbacks existent in the prior art.

According to a first aspect of the present disclosure, an electrically controlled fluorescent liquid crystal light valve is provided and may comprise a liquid crystal cell, a disubstituted phenylethylene photoluminescent material miscible with the liquid crystal molecules in the liquid crystal cell, and a control circuit for controlling the liquid crystal cell. The disubstituted phenylethylene photoluminescent material used in the electrically controlled fluorescent liquid crystal light valve of the present disclosure, as compared to a conventional liquid crystal light valve that uses a cyan-substituted-diphenylethylene photoluminescent material, has a better molecule planarity and a greater electron delocalization, which excites fluorescence more easily, exhibits more luminous efficiency and can effect a higher contrast; moreover, the disubstituted phenylethylene photoluminescent material used in the electrically controlled fluorescent liquid crystal light valve of the present disclosure has a fine compatibility with liquid crystal molecules, for which only a blending with the liquid crystal molecules is required before they can become homogenous, where the manufacturing process is simple. Furthermore, in case where no backlight source is necessary, a disubstituted phenylethylene photoluminescent material used to effect self-illumination can also be advantageous in reducing the process cost.

In one embodiment of the present disclosure, when light of a certain wavelength is radiated onto the liquid crystal cell comprising the disubstituted phenylethylene photoluminescent material, it can excite the disubstituted phenylethylene photoluminescent material to emit fluorescent light. By virtue of the fluorescent light emitted by the disubstituted phenylethylene photoluminescent material, an self-illumination of the electrically controlled fluorescent liquid crystal light valve is effected and the need for a backlight source is bypassed.

In another embodiment of the present disclosure, the control circuit controls the liquid crystal cell such that the liquid crystal cell is in a transparent state (H state) or a scattering state (FC state) or any state between the two, or is switched between these states. In this way, a quick switching between these states can be effected and a dynamically reversible regulation of the electrically controlled fluorescent liquid crystal light valve is realized.

Alternatively, the disubstituted phenylethylene photoluminescent material and the liquid crystal molecules have intermolecular forces.

Preferably, the disubstituted phenylethylene photoluminescent material and the liquid crystal molecules have a guest-host effect.

By virtue of the intermolecular forces and/or guest-host effect between the disubstituted phenylethylene photoluminescent material and the liquid crystal molecules, the liquid crystal molecules show an inductive function to the disubstituted phenylethylene photoluminescent material such that the liquid crystal molecules and the disubstituted phenylethylene photoluminescent material can rotate in synchronization.

In yet another embodiment of the present disclosure, the disubstituted phenylethylene photoluminescent material has a structural formula of:

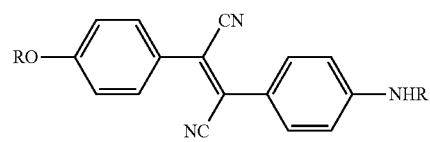

wherein R is $C_4$-$C_{12}$ straight-chain alkanes.

In a further embodiment of the present disclosure, the liquid crystal cell further comprises: a first transparent substrate; a second transparent substrate; an upper electrode formed on the first transparent substrate; a lower electrode formed on the second transparent substrate; a liquid crystal layer located between the first transparent substrate and the second transparent substrate and comprising the liquid crystal molecules; a polymer network, wherein the liquid crystal molecules are dispersed in the polymer network; a first planar orientation layer disposed between the first transparent substrate and the liquid crystal layer; a second planar orientation layer disposed between the liquid crystal layer and the second transparent substrate, the first planar orientation layer and the second planar orientation layer being mutually opposite parallel planar orientation layers, and the liquid crystal layer further comprising a chiral agent and a photoinitiator, the liquid crystal molecules comprising nematic-phase liquid crystal molecules.

In one embodiment of the present disclosure, the control circuit controls a voltage applied to the liquid crystal cell. As the voltage increases, the fluorescent light intensity and the contrast of the liquid crystal cell both decreases, and when the voltage arrives at a saturation value, the fluorescent light intensity and the contrast of the liquid crystal cell remain constant.

In another embodiment of the present disclosure, the first transparent substrate is a color filter substrate and the second transparent substrate is an array substrate, or the first transparent substrate is an array substrate and the second transparent substrate is a color filter substrate.

According to a second aspect of the present disclosure, a display device is provided and may comprise the above-said electrically controlled fluorescent liquid crystal light valve. The display device comprising the electrically controlled fluorescent liquid crystal light valve of the present disclosure excites fluorescence easily, exhibits high luminous efficiency and can effect a higher contrast. In case where no backlight source is necessary, a disubstituted phenylethylene photoluminescent material is used to effect self-illumination and is advantageous in reducing the process cost.

DESCRIPTION OF DRAWINGS

By illustrating the embodiments shown in conjunction with the drawings, the above and other features of the present disclosure will become more apparent, wherein.

DESCRIPTION OF EMBODIMENTS

Figure 1:
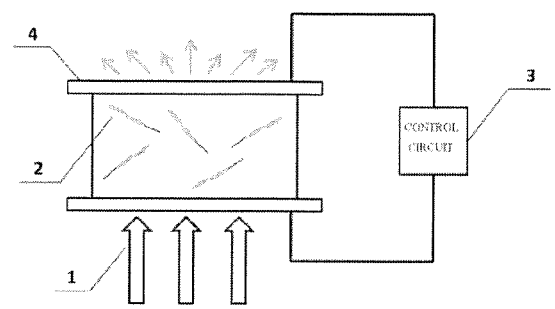
FIG. 1 schematically shows an electrically controlled fluorescent liquid crystal light valve according to a first aspect of the present disclosure.

It is, first of all, to be noted that the terms relating to positions and directions mentioned in the present disclosure, such as "upper", "lower", "left" and "right", refer to directions as viewed from a frontal of the principal plane of the drawings. Therefore, the terms "upper", "lower", "left", "right", etc., relating to positions and directions in the present disclosure indicate only the relative positional relations in cases as shown in the drawings. They are given only for the purpose of illustration and are not intended for limiting the scope of the present disclosure.

Hereinafter, the present disclosure will be described in detail with reference to FIGS. 1-5.

FIG. 1 schematically shows an electrically controlled fluorescent liquid crystal light valve according to a first aspect of the present disclosure, and it may comprise a liquid crystal cell 4, a photoluminescent material 2 miscible with the liquid crystal molecules in the liquid crystal cell 4, specifically a disubstituted phenylethylene photoluminescent material (denoted by reference sign 304 in FIGS. 3a and 3b), and a control circuit 3 for controlling the liquid crystal cell 4). For a structure of the liquid crystal cell in each embodiment of the present disclosure, the same structures as or similar structures to the prior art can be used. In the following particular embodiments, the component elements of the liquid crystal cell will be further described and are not described here in detail.

The disubstituted phenylethylene photoluminescent material used in each embodiment of the electrically controlled fluorescent liquid crystal light valve of the present disclosure, as compared to a prior art liquid crystal light valve that uses a cyan-substituted-diphenylethylene photoluminescent material, has a better molecule planarity and a greater electron delocalization, which excites fluorescence more easily, exhibits more luminous efficiency and can effect a higher contrast. The disubstituted phenylethylene photoluminescent material used in each embodiment of the electrically controlled fluorescent liquid crystal light valve of the present disclosure has a fine compatibility with liquid crystal molecules, for which only a blending with the liquid crystal molecules is required before they can become homogenous, where the manufacturing process is simple. In case where no backlight source is necessary, a disubstituted phenylethylene photoluminescent material is used to effect self-illumination and is advantageous in reducing the process cost.

The control circuit used in each embodiment of the present disclosure can be a common control circuit for use in the art, where the control circuit may control the size of a voltage applied to the liquid crystal cell 4.

Figure 3A:
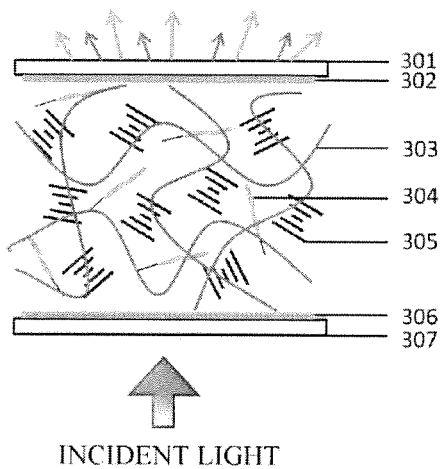
FIG. 3a schematically shows another embodiment of the electrically controlled fluorescent liquid crystal light valve (in which the control circuit is omitted) according to the present disclosure, with states of the respective elements including the photoluminescent material, the liquid crystal layer, the polymer network, etc., under no applied voltage.

FIG. 3a schematically shows another embodiment of the electrically controlled fluorescent liquid crystal light valve (in which the control circuit is omitted) according to the present disclosure, with states of the respective elements including the photoluminescent material, the liquid crystal layer, the polymer network, etc., under no applied voltage. In a particular embodiment of the present disclosure, the liquid crystal cell 4 may comprise: a first transparent substrate 301; a second transparent substrate 307; an upper electrode (not shown) formed on the first transparent substrate 301; a lower electrode (not shown) formed on the second transparent substrate 307; a liquid crystal layer located between the first transparent substrate 301 and the second transparent substrate 307 and comprising the liquid crystal molecules 305; a polymer network 303, wherein the liquid crystal molecules 305 are dispersed in the polymer network 303; a first planar orientation layer 302 disposed between the first transparent substrate 301 and the liquid crystal layer; a second planar orientation layer 306 disposed between the liquid crystal layer and the second transparent substrate 307, the first planar orientation layer 302 and the second planar orientation layer 306 being mutually opposite parallel planar orientation layers, and the liquid crystal layer further comprising a chiral agent and a photoinitiator; the liquid crystal molecules 305 may comprise nematic-phase liquid crystal molecules.

The first transparent substrate 301 and the second transparent substrate 307 are transparent for the purpose of transmitting light. The control circuit 3 applies a voltage to the liquid crystal cell 4 via the upper electrode (not shown) on the first transparent substrate 301 and the lower electrode (not shown) on the second transparent substrate 307. The polymer network 303 used in each embodiment of the present disclosure is known to a skilled person in the art, which is not described here in detail for being not the key points of the present disclosure. The mutually opposite parallel planar orientation layers used in each embodiment of the present disclosure, e.g. the first planar orientation layer 302 and the second planar orientation layer 306, may be manufactured by using a process for opposite frictional directions.

In one embodiment of the present disclosure, when light of a certain wavelength (incident light) is radiated onto the liquid crystal cell comprising the disubstituted phenylethylene photoluminescent material 304, it can excite the disubstituted phenylethylene photoluminescent material 304 to emit fluorescent light of a certain wavelength.

In a further embodiment of the present disclosure, the control circuit 3 controls the liquid crystal cell 4 in e.g. the size of a voltage applied to the liquid crystal cell 4, such that the liquid crystal cell 4 is in a transparent state (H state) or a scattering state (FC state) or any state between the two, or is switched between these states. In this way, a quick switching between these states can be effected and a dynamically reversible regulation of the electrically controlled fluorescent liquid crystal light valve is realized.

Figure 2:
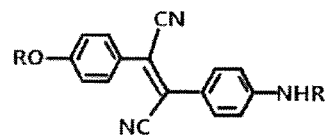
FIG. 2 schematically shows a chemical formula of the disubstituted phenylethylene photoluminescent material used in one embodiment of the electrically controlled fluorescent liquid crystal light valve according to the present disclosure.

It is to be noted that the disubstituted phenylethylene photoluminescent material used in each embodiment of the present disclosure refer rather to a class of materials than a single type of material. FIG. 2 schematically shows a chemical formula of the disubstituted phenylethylene photoluminescent material used in one embodiment of the electrically controlled fluorescent liquid crystal light valve according to the present disclosure. For example, the disubstituted phenylethylene photoluminescent material has a structural formula of:

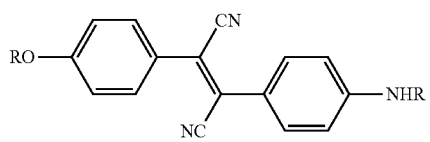

wherein R is $C_4$-$C_{12}$ straight-chain alkanes.

Surprisingly to inventors of the disclosure, such disubstituted phenylethylene photoluminescent material would not convert in structure into another type of material upon the irradiation of light. Meanwhile, since the material is disubstituted with alkyl chains R, wherein R is $C_4$-$C_{12}$ straight-chain alkanes, the introduction of the alkyl groups has increased the conjugacy of molecules and enhanced the free electron delocalization, which can excite more intense fluorescent light; the material has a fine compatibility with liquid crystal molecules, for which only a blending with the liquid crystal molecules is required before they can become homogenous, where the manufacturing process is simple.

The disubstituted phenylethylene photoluminescent material 304 and the liquid crystal molecules 305 have intermolecular forces. In particular, the disubstituted phenylethylene photoluminescent material 304 and the liquid crystal molecules 305 have a guest-host effect. The guest-host effect in the art refers to a realignment of e.g. a disubstituted phenylethylene photoluminescent material (guest) and a nematic liquid crystal (host) under the effect of an electric field, it causing changes in the color and in the degree of transmission. By virtue of the intermolecular forces and/or guest-host effect between the disubstituted phenylethylene photoluminescent material 304 and the liquid crystal molecules 305, the liquid crystal molecules 305 show an inductive function to the disubstituted phenylethylene photoluminescent material 304 such that the liquid crystal molecules 305 and the disubstituted phenylethylene photoluminescent material 304 can rotate in synchronization, thereby effecting changes in the color and in the degree of transmission.

When the control circuit applies no voltage to the liquid crystal cell, as shown in FIG. 3a, the liquid crystal molecules 305 comprised in the liquid crystal layer are aligned irregularity inducing also an irregular alignment of the photoluminescent material, e.g. a disubstituted phenylethylene photoluminescent material 304, upon which the entire system is in a state of uneven heights. When an incident light of certain wavelength (or ambient light) irradiates the liquid crystal cell, the incident light would scatter intensely within the liquid crystal cell (the liquid crystal cell is in the scattering state) and photons of the incident light would refract multiple times at the interfaces of the liquid crystal domains, by which the incident light photons could collide with the disubstituted phenylethylene photoluminescent material 304 to a maximum possibility, thus resulting in a largest fluorescent light intensity of the liquid crystal cell.

Figure 3B:
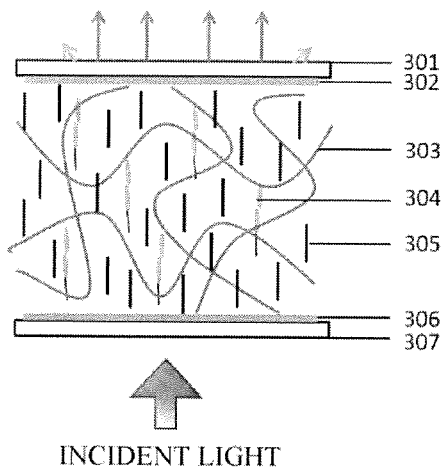
FIG. 3b schematically shows yet another embodiment of the electrically controlled fluorescent liquid crystal light valve (in which the control circuit is omitted) according to the present disclosure, with states of the respective elements including the photoluminescent material, the liquid crystal layer, the polymer network, etc., under an applied voltage.

FIG. 3b schematically shows yet another embodiment of the electrically controlled fluorescent liquid crystal light valve according to the present disclosure, with states of the respective elements including the photoluminescent material, the liquid crystal layer, the polymer network, etc., under an applied voltage. When the control circuit applies an voltage (larger than or equal to a saturation voltage $V_{sat}$) to the liquid crystal cell, the helix of the liquid crystal molecules 305 in the liquid crystal layer is disentangled under the effect of the electric field, and the liquid crystal molecules 305 are aligned along the direction of the electric field inducing also an alignment of the disubstituted phenylethylene photoluminescent material 304 vertically to the transparent substrates, e.g. to the first transparent substrate 301 and the second transparent substrate 307 (based on the "guest-host effect" of the liquid crystal molecules 305, the disubstituted phenylethylene photoluminescent material 304 can rotate in synchronization with the liquid crystal molecules 305). The entire system forms a homogenous liquid crystal single domain, and when a light source of certain wavelength, e.g. light 1 of certain wavelength (or ambient light) in FIG. 1, irradiates the liquid crystal cell, the incident light has a reduced scattering effect within the liquid crystal cell (the liquid crystal cell is in the transparent state) and the incident light photons pass through the interior of the liquid crystal cell very easily so that a possibility for the incident light photons to collide with the disubstituted phenylethylene photoluminescent material 304 decreases dramatically, leading directly to a substantial reduction in the fluorescent light intensity of the liquid crystal cell. When the output voltage of the control circuit is in (0V~$V_{sat}$), the liquid crystal cell displays intermediate states between the scattering state and the transparent state, while the fluorescent light intensity of the liquid crystal cell is also in between.

Figure 4:
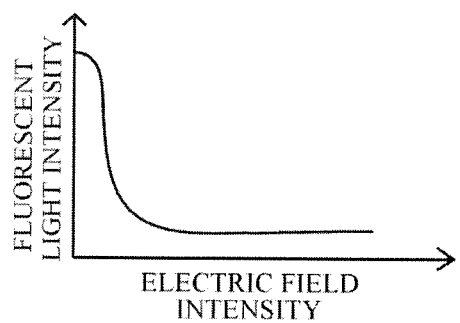
FIG. 4 schematically shows a diagram of relationship between the fluorescent light intensity and the electric field intensity in a further embodiment of the electrically controlled fluorescent liquid crystal light valve according to the present disclosure.

For example, FIG. 4 schematically shows a diagram of relationship between the fluorescent light intensity and the electric field intensity in a further embodiment of the electrically controlled fluorescent liquid crystal light valve according to the present disclosure. The control circuit controls a voltage applied to the liquid crystal cell. As the voltage increases, the fluorescent light intensity and the contrast of the liquid crystal cell both decreases, and when the voltage arrives at the saturation voltage, the fluorescent light intensity and the contrast of the liquid crystal cell substantially remain constant, whereby the fluorescent light intensity (contrast) of the electrically controlled fluorescent liquid crystal light valve is regulated.

Figure 5:
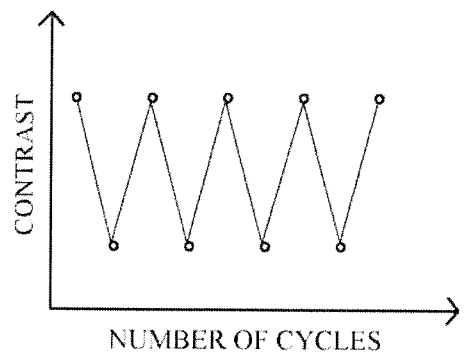
FIG. 5 schematically shows a dynamically regulated diagram of relationship between the contrast and the number of cycles in one embodiment of the electrically controlled fluorescent liquid crystal light valve according to the present disclosure.

FIG. 5 schematically shows a dynamically regulated diagram of relationship between the contrast and the number of cycles in one embodiment of the electrically controlled fluorescent liquid crystal light valve according to the present disclosure. When no voltage is applied to the liquid crystal cell, the liquid crystal cell is in a scattering state, in which the fluorescent light intensity thereof is maximum and the contrast is maximum; when a voltage is applied to the liquid crystal cell, the liquid crystal cell is in a transparent state, in which the fluorescent light intensity thereof is minimum and the contrast correspondingly is also minimum. By way of controlling the liquid crystal cell, the control circuit effects that the liquid crystal cell is in the transparent state or the scattering state or any state between the two, or is quickly switched between these states, and a dynamically reversible regulation of the electrically controlled fluorescent liquid crystal light valve is realized.

In a variable embodiment of the present disclosure, the first transparent substrate may be a color filter substrate and the second transparent substrate may be an array substrate, or the first transparent substrate may be an array substrate and the second transparent substrate may be a color filter substrate, and this may be advantageous in colored display. Specific structures of a color filter substrate and an array substrate are not described here in detail for a skilled person in the art would have no difficulty in learning about the same in conjunction with the prior art.

According to a second aspect of the present disclosure, a display device is provided and may comprise the above-said electrically controlled fluorescent liquid crystal light valve. As compared to a prior art display device, the display device of the present disclosure excites fluorescence easily, exhibits high luminous efficiency and can effect a higher contrast. In case where no backlight source is necessary, a disubstituted phenylethylene photoluminescent material is used to effect self-illumination and is advantageous in reducing the process cost.

Although the present disclosure has been described with reference to the embodiments within current considerations, it is appreciated that the present disclosure is not limited to the disclosed embodiments. On the contrary, the present disclosure is intended to cover various modifications and equivalent arrangements involved in the spirit and scope of the appended claims. The scope of the following claims conforms to the most comprehensive explanation so as to include such modifications as well as equivalent structures and functions.

The invention claimed is:

1. An electrically controlled fluorescent liquid crystal light valve comprising a liquid crystal cell, a disubstituted phenylethylene photoluminescent material miscible with the liquid crystal molecules in the liquid crystal cell, and a control circuit for controlling the liquid crystal cell;

wherein the disubstituted phenylethylene photoluminescent material has a structural formula of:

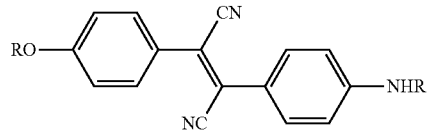

wherein R is $C_4$-$C_{12}$ straight-chain alkanes.

2. The electrically controlled fluorescent liquid crystal light valve of claim 1, wherein when light of a certain wavelength is radiated onto the liquid crystal cell comprising the disubstituted phenylethylene photoluminescent material, it can excite the disubstituted phenylethylene photoluminescent material to emit fluorescent light.

3. The electrically controlled fluorescent liquid crystal light valve of claim 2, wherein the control circuit controls the liquid crystal cell such that the liquid crystal cell is in a transparent state or a scattering state or any state between the two, or is switched between these states.

4. The electrically controlled fluorescent liquid crystal light valve of claim 3, wherein the disubstituted phenylethylene photoluminescent material and the liquid crystal molecules have intermolecular forces.

5. The electrically controlled fluorescent liquid crystal light valve of claim 4, wherein the disubstituted phenylethylene photoluminescent material and the liquid crystal molecules have a guest-host effect.

6. The electrically controlled fluorescent liquid crystal light valve of claim 1, wherein the liquid crystal cell further comprises: a first transparent substrate; a second transparent substrate; an upper electrode formed on the first transparent substrate; a lower electrode formed on the second transparent substrate; a liquid crystal layer located between the first transparent substrate and the second transparent substrate and comprising the liquid crystal molecules; a polymer network, wherein the liquid crystal molecules are dispersed in the polymer network; a first planar orientation layer disposed between the first transparent substrate and the liquid crystal layer; a second planar orientation layer disposed between the liquid crystal layer and the second transparent substrate, the first planar orientation layer and the second planar orientation layer being mutually opposite parallel planar orientation layers, and the liquid crystal layer further comprising a chiral agent and a photoinitiator, the liquid crystal molecules comprising nematic-phase liquid crystal molecules.

7. The electrically controlled fluorescent liquid crystal light valve of claim 6, wherein the control circuit controls a voltage applied to the liquid crystal cell; as the voltage increases, the fluorescent light intensity and the contrast of the liquid crystal cell both decreases, and when the voltage arrives at a saturation value, the fluorescent light intensity and the contrast of the liquid crystal cell remain constant.

8. The electrically controlled fluorescent liquid crystal light valve of claim 6, wherein the first transparent substrate is a color filter substrate and the second transparent substrate is an array substrate, or the first transparent substrate is an array substrate and the second transparent substrate is a color filter substrate.

9. A display device comprising the electrically controlled fluorescent liquid crystal light valve of claim 1.

10. The display device of claim 9, wherein the liquid crystal cell further comprises:
a first transparent substrate;
a second transparent substrate;
an upper electrode formed on the first transparent substrate;
a lower electrode formed on the second transparent substrate;
a liquid crystal layer located between the first transparent substrate and the second transparent substrate and comprising the liquid crystal molecules;
a polymer network, wherein the liquid crystal molecules are dispersed in the polymer network;
a first planar orientation layer disposed between the first transparent substrate and the liquid crystal layer;
a second planar orientation layer disposed between the liquid crystal layer and the second transparent substrate, the first planar orientation layer and the second planar orientation layer being mutually opposite parallel planar orientation layers, and the liquid crystal layer further comprising a chiral agent and a photoinitiator, the liquid crystal molecules comprising nematic-phase liquid crystal molecules.

11. An electrically controlled fluorescent liquid crystal light valve comprising a liquid crystal cell, a disubstituted phenylethylene photoluminescent material miscible with the liquid crystal molecules in the liquid crystal cell, and a control circuit for controlling the liquid crystal cell;
wherein the liquid crystal cell further comprises: a first transparent substrate; a second transparent substrate; an upper electrode formed on the first transparent substrate; a lower electrode formed on the second transparent substrate; a liquid crystal layer located between the first transparent substrate and the second transparent substrate and comprising the liquid crystal molecules; a polymer network, wherein the liquid crystal molecules are dispersed in the polymer network; a first planar orientation layer disposed between the first transparent substrate and the liquid crystal layer; a second planar orientation layer disposed between the liquid crystal layer and the second transparent substrate, the first planar orientation layer and the second planar orientation layer being mutually opposite parallel planar orientation layers, and the liquid crystal layer further comprising a chiral agent and a photoinitiator, the liquid crystal molecules comprising nematic-phase liquid crystal molecules.

12. The electrically controlled fluorescent liquid crystal light valve of claim 11, wherein when light of a certain wavelength is radiated onto the liquid crystal cell comprising the disubstituted phenylethylene photoluminescent material, it can excite the disubstituted phenylethylene photoluminescent material to emit fluorescent light.

13. The electrically controlled fluorescent liquid crystal light valve of claim 12, wherein the control circuit controls the liquid crystal cell such that the liquid crystal cell is in a transparent state or a scattering state or any state between the two, or is switched between these states.

14. The electrically controlled fluorescent liquid crystal light valve of claim 13, wherein the disubstituted phenylethylene photoluminescent material and the liquid crystal molecules have intermolecular forces.

15. The electrically controlled fluorescent liquid crystal light valve of claim 14, wherein the disubstituted phenylethylene photoluminescent material and the liquid crystal molecules have a guest-host effect.

16. The electrically controlled fluorescent liquid crystal light valve of claim 11, wherein the disubstituted phenylethylene photoluminescent material has a structural formula of:

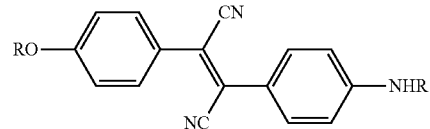

wherein R is $C_4$-$C_{12}$ straight-chain alkanes.

17. The electrically controlled fluorescent liquid crystal light valve of claim 11, wherein the control circuit controls a voltage applied to the liquid crystal cell; as the voltage increases, the fluorescent light intensity and the contrast of the liquid crystal cell both decreases, and when the voltage arrives at a saturation value, the fluorescent light intensity and the contrast of the liquid crystal cell remain constant.

18. The electrically controlled fluorescent liquid crystal light valve of claim 11, wherein the first transparent substrate is a color filter substrate and the second transparent substrate is an array substrate, or the first transparent substrate is an array substrate and the second transparent substrate is a color filter substrate.

19. A display device comprising the electrically controlled fluorescent liquid crystal light valve of claim 11.

20. The display device of claim 19, wherein the disubstituted phenylethylene photoluminescent material has a structural formula of:

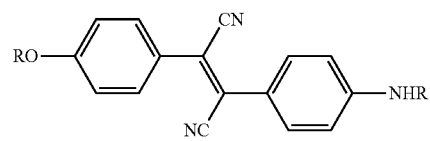

wherein R is $C_4$-$C_{12}$ straight-chain alkanes.

* * * * *